(12) United States Patent
Mei et al.

(10) Patent No.: US 6,809,722 B2
(45) Date of Patent: *Oct. 26, 2004

(54) HAND-HELD MOBILE MOUSE

(76) Inventors: Yu Mei, 53-21 96$^{th}$ St., Corona, NY (US) 11368; Jin Xia Bao, 53-21 96$^{th}$ St., Corona, NY (US) 11368; Si Ping Bao, 53-21 96$^{th}$ St., Corona, NY (US) 11368

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/443,518

(22) Filed: Nov. 19, 1999

(65) Prior Publication Data

US 2002/0118167 A1 Aug. 29, 2002

Related U.S. Application Data

(60) Provisional application No. 60/147,729, filed on Aug. 6, 1999, and provisional application No. 60/126,743, filed on Mar. 29, 1999.

(51) Int. Cl.$^7$ .................................................. G09G 5/08
(52) U.S. Cl. ..................... 345/163; 345/157; 345/158; 345/159; 345/167; 345/173; 345/184; 348/734; 273/148 B
(58) Field of Search ................................ 345/163, 167, 345/157, 158, 164, 169, 172, 184, 173, 159; 341/22; 348/734; 273/148 B

(56) References Cited

U.S. PATENT DOCUMENTS

| | | | |
|---|---|---|---|
| 4,739,128 A | 4/1988 | Grisham | 206/6 A |
| 4,952,919 A | 8/1990 | Nippoldt | 340/710 |
| 5,063,289 A | 11/1991 | Jasinski et al. | 250/221 |
| 5,078,019 A | 1/1992 | Aoki | 340/710 |

(List continued on next page.)

*Primary Examiner*—Xiao Wu
*Assistant Examiner*—Abbas I Abdulselam
(74) *Attorney, Agent, or Firm*—Collard & Roe, P.C.

(57) ABSTRACT

A hand-held or palm mobile mouse is contained in a mini hand-held shaped housing to be held in the palm of a user with a sphere arranged on the top easily and naturally reached by the user's thumb. The thumb of the user can rotate the sphere, which contains a magnetic core inside, to cause a corresponding cursor movement on a computer screen through a magnetically activated rolling movement detection unit or units and press down on the sphere to carry out click function commands or menu functions pointed to by the cursor on the screen. Alternatively, the magnetic core may be omitted by supporting the sphere on four free rolling roller units, two of which are used to implement the rolling movement detection function. There may also be key-buttons on the area where the user's fingers rest to implement click function by a user's fingers. There may also be a wheel/click button for cursor extension movement and click command functions. The mouse is pad-less, wire-less, freely used in any direction or position for the comfort of a user's wrist, and easily carried by a user for convenience. The remote wireless signals of the mouse or additional mice can be programmed for user identification, for added security. The mouse is a flexible and convenient input device for computers, especially miniaturized notebook computers.

29 Claims, 13 Drawing Sheets

U.S. PATENT DOCUMENTS

| | | | |
|---|---|---|---|
| D340,042 S | 10/1993 | Copper et al. | D14/114 |
| 5,280,276 A | 1/1994 | Kwok | 345/167 |
| 5,355,148 A | 10/1994 | Anderson | 345/166 |
| D356,558 S | 3/1995 | Montgomery et al. | D14/114 |
| 5,473,344 A * | 12/1995 | Bacon et al. | 345/163 |
| 5,493,314 A * | 2/1996 | Rowe | 345/156 |
| 5,504,500 A * | 4/1996 | Garthwaite et al. | 345/157 |
| 5,512,892 A | 4/1996 | Corballis et al. | 341/22 |
| 5,528,523 A | 6/1996 | Yoshida | 364/709.11 |
| 5,546,106 A * | 8/1996 | Walgers | 345/184 |
| 5,546,334 A | 8/1996 | Hsieh et al. | 364/709.11 |
| 5,583,541 A | 12/1996 | Solhjell | 345/163 |
| D378,086 S | 2/1997 | Sheehan et al. | D14/114 |
| 5,620,371 A | 4/1997 | Blonder | 463/37 |
| 5,635,926 A * | 6/1997 | Li | 341/20 |
| D381,661 S | 7/1997 | Althans | D14/218 |
| 5,666,473 A | 9/1997 | Wallace | 345/420 |
| 5,668,574 A * | 9/1997 | Jarlance-Huang | 345/158 |
| 5,694,562 A * | 12/1997 | Fisher | 345/839 |
| 5,754,126 A | 5/1998 | Hilbrink et al. | 341/20 |
| 5,771,038 A * | 6/1998 | Wang | 345/163 |
| 5,790,102 A | 8/1998 | Nassimi | 345/163 |
| 5,854,621 A | 12/1998 | Junod et al. | 345/158 |
| 5,920,307 A * | 7/1999 | Blonder et al. | 345/167 |
| 5,945,981 A | 8/1999 | Paull et al. | 345/180 |
| 5,952,996 A | 9/1999 | Kim et al. | 345/158 |
| 5,956,018 A | 9/1999 | Pejic et al. | 345/157 |
| 6,031,522 A * | 2/2000 | Strand | 345/163 |
| 6,049,326 A * | 4/2000 | Beyda et al. | 345/157 |
| 6,069,614 A * | 5/2000 | Singhal | 345/158 |
| 6,075,518 A * | 6/2000 | Pruchniak | 345/157 |
| 6,184,868 B1 * | 2/2001 | Shahoian et al. | 345/161 |
| 6,184,869 B1 * | 2/2001 | Harding et al. | 345/163 |
| 6,225,976 B1 * | 5/2001 | Yates et al. | 345/156 |
| 6,232,959 B1 * | 5/2001 | Pedersen | 345/161 |
| 6,239,785 B1 * | 5/2001 | Wallace et al. | 345/156 |
| 6,256,011 B1 * | 7/2001 | Culver | 345/157 |
| 6,297,795 B1 * | 10/2001 | Kato et al. | 345/684 |
| 6,369,797 B1 * | 4/2002 | Maynard, Jr. | 345/163 |
| 6,448,964 B1 * | 9/2002 | Isaacs et al. | 345/419 |

\* cited by examiner

HAND-HELD MOBILE MOUSE

CROSS-REFERENCE TO RELATED APPLICATIONS

This application is based on copending provisional application Nos. 60/126,743, filed Mar. 29, 1999 and 60/147,729, filed Aug. 6, 1999.

BACKGROUND OF THE INVENTION

1. Field of the Invention

The present invention relates to input devices for computer systems and more particularly to the construction, function, and design of a mouse used in computers, especially in notebook computers.

2. The Prior Art

At the present time there are a large variety of computer mouse and trackball designs. See, e.g., U.S. Pat. No. 5,583,541 to Solhjell, U.S. Pat. No. 5,280,276 to Kwok, U.S. Pat. No. 5,078,019, U.S. Pat. No. 5,063,289 to Jasinski et al, U.S. Pat. No. 4,952,919 to Nippoldt, U.S. Pat. No. 5,790,102 to Nassimi, U.S. Pat. No. 5,620,371 to Blonder, U.S. Pat. No. 5,355,148 to Anderson, and U.S. Pat. No. 5,546,334 to Hsieh et al.

As one of the major input devices, a mouse has become an inseparable part of desktop computer systems. There is no place for a mouse in a notebook computer system, however, because of the size of the mouse and its inseparability from a mouse pad.

There are many trackballs or track points developed for notebook computers. All of them are limited to cursor movements on the screen of the notebook computers. Conventional mice for cursor moving/placing, object picking, editing, drawing, painting, menu selecting, window opening and closing, etc. are not used in notebook computer systems. However, most computer users still like the convenience and click feeling of a mouse. It is also very hard to draw a graphic precisely in a notebook computer without a mouse. A notebook computer requires the user to use two hands or two fingers to draw a line—one hand or one finger to press a key or button to hold the start point of a cursor and another hand or another finger to rotate the trackball or track point to move the cursor to another location. This procedure is obviously very inconvenient.

Because the design trend of notebook computer systems is toward miniaturization: ultra-thinner, ultra-lighter, and ultra-smaller, there is no place in such systems for a mouse pad at all. Desktop computer systems too are being built smaller with mini-packed computer bodies and accessories. A mouse pad placed beside the keyboard of a desktop computer is typically sized at about 9 inches long×8 inches wide×0.125 inches high. The mouse pad requires a certain amount of desk space. Although wireless mice have been available in the market for years, many still depend on mouse pad for operation, rendering the remote control meaningless. Wireless mice or trackballs are shown in U.S. Pat. No. 5,854,621 to Junod et al and U.S. Design Pat. No. 356,558 to Montgomery.

A wireless palm mouse is shown in U.S. Pat. No. 5,754,126 to Hilbrink et al in which the mouse has a trackball on the flat underside of the mouse for cursor movement as the trackball is moved along a surface and separate switch for point and click or drag and drop user-initiated actions. See also U.S. Design Pat. No. 381,661 to Althans, U.S. Design Pat. No. 378,086 to Sheehan et al; U.S. Design Pat. No. 340,042 to Copper et al.

A wireless computer input system using a pen-type input device and a receiver is shown in U.S. Pat. No. 5,945,981 to Paull et al. See also U.S. Pat. No. 5,952,996 to Kim et al. A hand-held pointer control and input device is shown in U.S. Pat. No. 5,956,018 to Pejic et al. Other patents of general interest relate to joysticks for use in electronic devices. See, e.g. U.S. Pat. No. 4,739,128 to Grisham, U.S. Pat. No. 5,512,892 to Corballis et al.

The certain inflexible operation position of a conventional mouse and trackball creates the potential for frequent wrist injury to the user. Because a conventional mouse is able to move only within the certain small area of the mouse pad, the wrist of the user is repeatedly and frequently hit and pressured without enough rest.

Conventional mice and trackballs are mainly designed for right-handed users. Right-handed users and left-handed users are not able to use the same mouse or trackball without difficulty. Left-handed users usually have difficulty finding suitable left-handed mice and trackballs for them.

A conventional mouse of a desktop computer system is connected to the computer motherboard through a cable. The cable has a certain and limited length. A cabled mouse or trackball, moreover, is designed for only a single user to operate the computer. It is not designed to share multiple operations on the computer screen with other users operating other mice or trackballs. It is not very convenient to use a single cabled mouse or trackball to operate a multiple of shared computer system screens for education classes, business conferences, computer graphic work, and Internet communications.

Many new data input devices which combine a conventional mouse and a trackball are large in size. These large size devices are not suitably incorporated into the design trend of mini-sized notebook computer systems.

Conventional trackballs and track points also are operated rotationally for cursor movement only, not for press-click function.

The rolling balls of conventional mice and trackballs are easily dirtied from contact with fingers and dirty mouse pads. The dirt accumulates on the round surface of the mouse ball or track ball and causes incorrect cursor movements on the screen.

Another disadvantage of a conventional mouse or trackball results from the use of passwords, as a security measure to access software in a computer system. A conventional mouse or trackball is not able to act as a secured key to open and close the whole computer system and fit into the pocket of the computer user when finished.

Therefore, in order to solve the foregoing problems and drawbacks, a need exists for a flexible, mini-sized, freely movable and storable, mobile mouse that fits in the palm of the user's hand during use, that will not become dirty from mouse pad contact to cause incorrect cursor movements, that has multiple playing functions, and that minimizes the risk of wrist injury.

OBJECTIVES AND FEATURES OF THE INVENTION

An object of the present invention is to provide a mini-sized, hand- or palm-held, wireless mobile mouse operable without a mouse pad which saves operating area when used with desktop computers and which may also be used with mini-sized notebook computers.

Another object of the present invention is to provide a hand-held mouse which avoids wrist injury because the user is free to move or operate the mouse in any direction while his or her wrist rests comfortably without strain or stress from confined movements of a mouse pad.

Yet another object of the present invention is to provide a hand-held mobile mouse which the user may easily use with either his or her right or left hand.

Another object of the present invention is to provide a hand-held mobile mouse which may by used in conjunction with other hand-held mobile mice for multiple playing of games or operation of computer functions on one shared computer screen.

SUMMARY OF THE INVENTION

The present invention provides a hand-held mobile mouse for a computer, such as a notebook computer, and a notebook computer and mouse system. The mouse comprises a housing having a shape designed to be held in a user's hand, preferably fitting within the user's palm, a sphere, preferably made of an elastic material and containing a round magnetic core inside, a rolling movement detection unit for generating a signal for cursor movements on the screen of the computer, a plurality of spring units mounted in the housing for vertical movement of the sphere to generate a signal to activate a computer programmed click function operation, a remote wireless signal unit for converting the signals from the rolling movement detection unit to signals transmitted to the computer, a circuit board or boards connected to the remote wireless signal unit, and a receptacle for batteries formed within the housing. Preferably, at least one click key activator is disposed on the housing for generating a signal to activate a computer programmed click function operation.

The notebook computer used in association with the hand-held mobile mouse has a remote wireless multiple signal receiver for receipt of signals transmitted by the mouse and a removable drawer under or in front of the keyboard to place and store the mouse.

By virtue of the compact mini-sized and pad-less/wireless remote control, the present invention provides an extremely versatile mouse that is especially designed for notebook computer systems.

The hand-held mobile mouse of the present invention may be operated by a single finger by rotating the sphere for precise cursor movements and by pressing the sphere down for prompt click or double-click computer functions.

The rolling movement detection unit may be operated to transmit "X-" and "Y-" rolling motions through a magnetic field flux and magnetic force between the sphere rotated by the thumb of a user and a small magnetic ball within the rolling movement detector. The round magnetic core inside the rolling sphere rotates the small magnetic ball by moving magnetic field intensity and rolling magnetic force.

Preferably, the rotating sphere is not in direct contact with the small magnetic ball so that the small magnetic ball remains clean and lets the rolling detection unit precisely signal the corresponding movements of a cursor on a screen.

Alternatively, the magnetic core may by omitted by supporting the sphere on four free rolling roller units, two of which are used to implement the rolling movement detection function. The mouse may be programmed with personal passwords and kept in the pocket of a user for security reasons. By programming the remote wireless radio signal generated by the mouse itself for identification, a personal password may be applied to both software and hardware at the same time.

Additional details of the invention are contained in the following detailed description and the attached drawings in which preferred embodiments are illustrated by way of example.

BRIEF DESCRIPTION OF THE DRAWINGS

Other objects and features of the present invention will become apparent from the following detailed description considered in conjunction with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
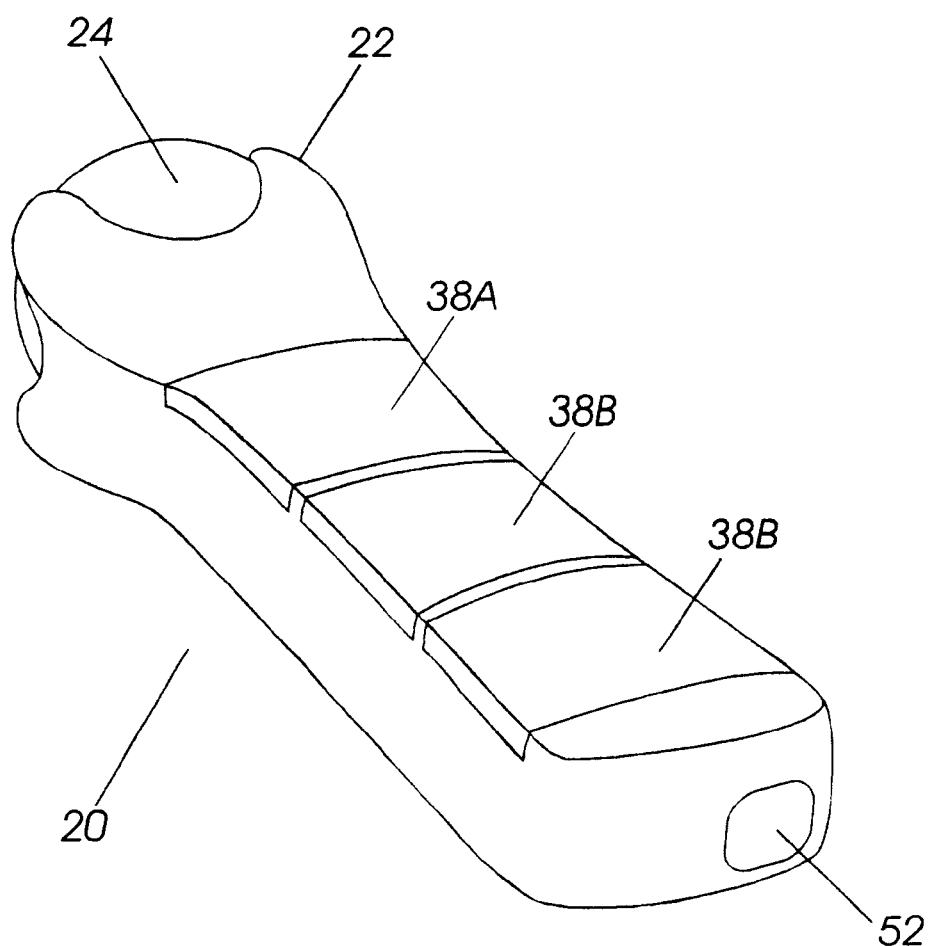
FIG. 1 is a perspective of a first embodiment of the present invention.
Figure 2:
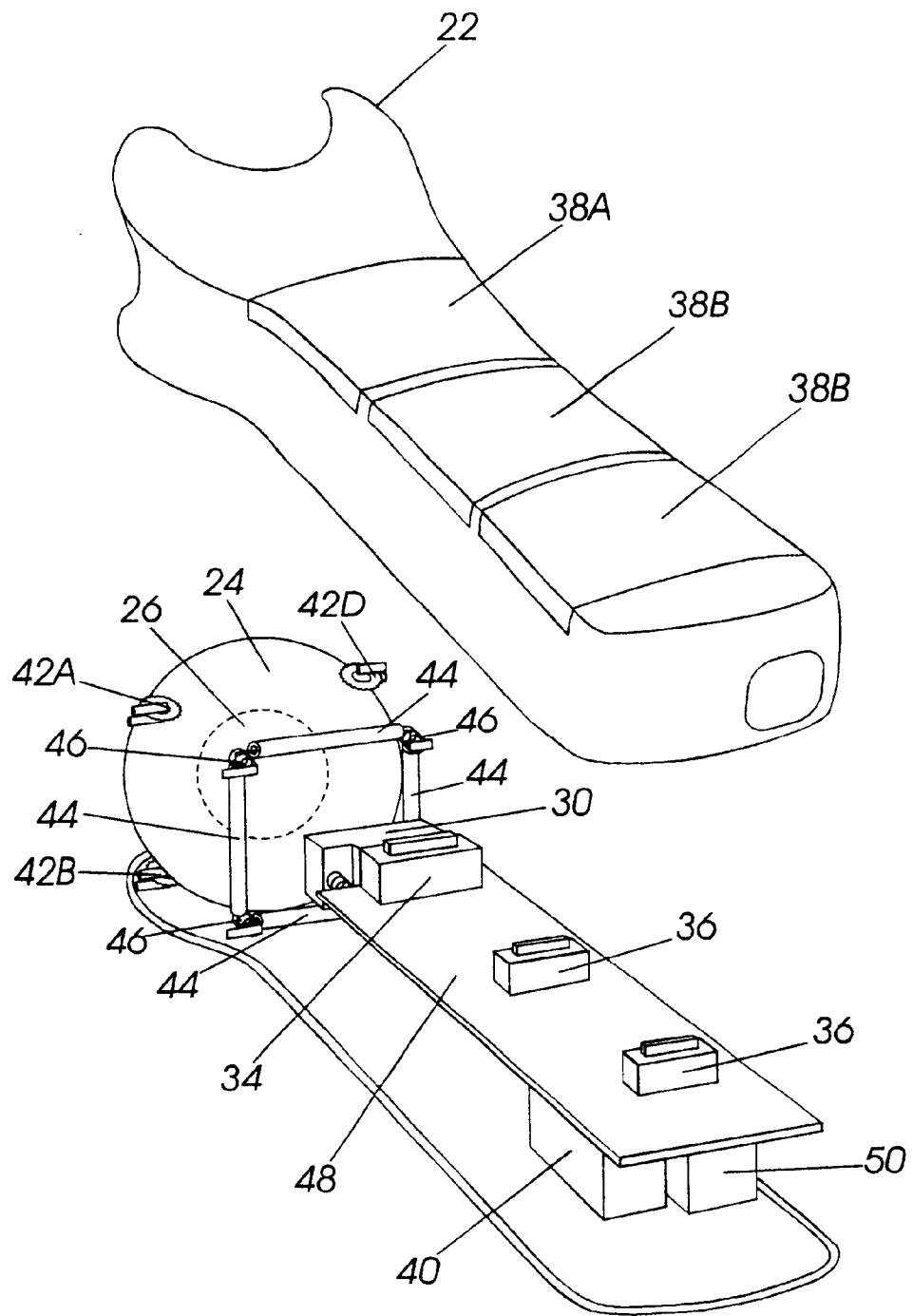
FIG. 2 is an exploded perspective view of the embodiment of FIG. 1.

FIGS. 1–7 show a first embodiment of the present invention. Hand-held mobile mouse 20 is mini-sized and able to be easily held in the palm of a user. Mouse 20 has a relatively large elastic sphere or ball 24 able to be rotated by the thumb of a user for accurate cursor movements and also to be pressed down by the thumb for prompt click or double-click commands. Mouse 20 has a housing or body 22 provided at the top with an inner collar edge to partially surround the upper portion of sphere 24. Mouse 20 also is preferably provided with a set of key buttons 38A and 38B for computer programmed click-functions to activate cursor pointed menu commands or screen functions of selecting, deselecting, editing, moving, drawing, painting, opening, and closing, etc. A box or receptacle 50 for batteries shown in FIG. 2 is formed within housing 22 having a battery door 52 as shown in FIG. 1 for inserting and removing batteries. The exact body design of mouse 20 may vary to make it easier to hold by a right or left handed user. Body 22 of mouse 20 is designed to be as small as possible. As electronic parts are built smaller, body 22 of mouse 20 may be made smaller.

Sphere 24 is typically made of elastic or similar material having a certain surface slipperiness for smooth rotation by a user. Sphere 24 can be freely rotated in any direction and pressed and released in an up-and-down direction when click function is desired. As shown in FIG. 2, there is a round magnetic core 26 (indicated by dot-dashed line) inside large elastic sphere or ball 24. Magnetic core 26 is magnetized and cooperates with a small magnetic ball 28 inside a rolling movement detection unit 30 shown in FIG. 6. Magnetic core 26 produces magnetic energy and air gap magnetic flux in the magnetic north pole and south pole directions. The magnetic energy produced and air gap magnetic flux may vary depending on the size of magnetic core 26, the magnetic material, and the distance between magnetic core 26 inside large ball 24 and small magnetic ball 28 inside rolling movement detection unit 30. Rolling movement detection unit 30 transfers the sensed rolling motions of small magnetic ball 28 into electrical signals to the computer for corresponding cursor movements on the computer screen.

Figure 6:
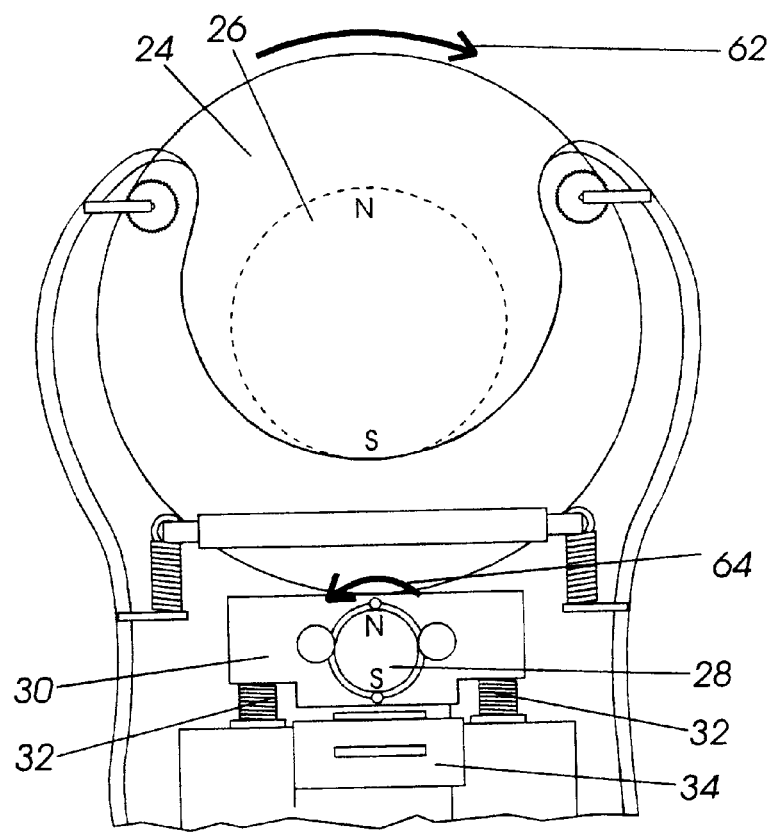
FIG. 6 is an enlarged side elevation view of the upper partial section of the embodiment of FIG. 1 with two arrows indicating rotation movements.

As shown in FIG. 2, mouse 20 is provided with a two-sided touch down switch 34 disposed on a circuit board 48, which may be activated to send a click command signal by either pressing down on large ball 24 or uppermost click button 38A. The front-side button of two-sided touch down switch 34 is to be touched and untouched by uppermost click button 38A. As shown in FIG. 6, pressing down on large ball 24 activates the same click command as pressing down on uppermost click button 38A.

Alternately, two-sided touch switch 34 may be replaced with two individual touch switches programmed for the same click command, one for touch or untouch from rolling movement detection unit 30 as shown on FIG. 6 and the other for press and unpress from uppermost key button 38A. The other two front-side touch switches on circuit board 48 shown in FIG. 2 are for press and release click functions of the other two key buttons 38B on the outside of housing 22. Alternatively, one switch and key button may be used instead of switches 36 and press buttons 38B depending on the particular computer programmed operation functions needed for mouse 20.

Figure 7:
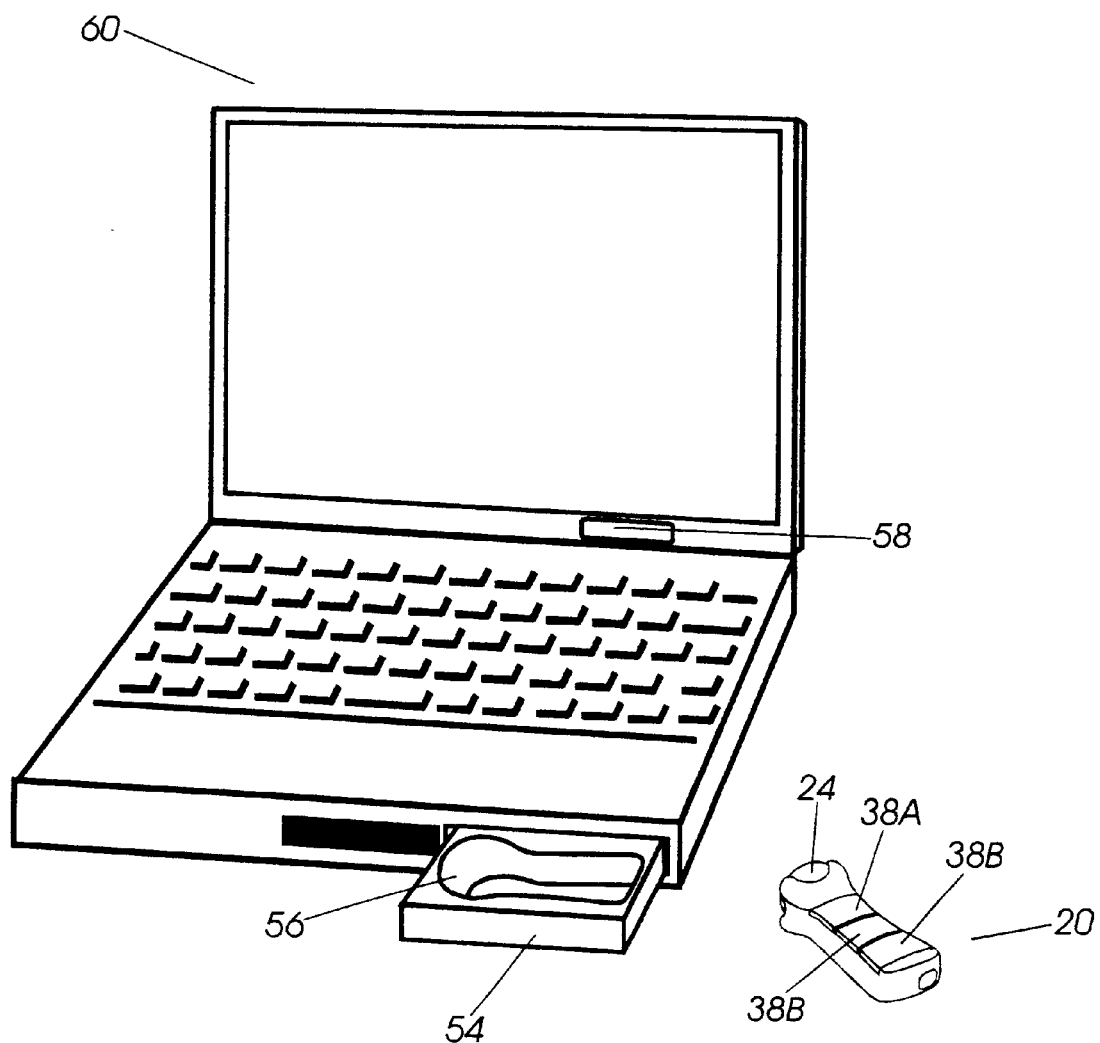
FIG. 7 is a perspective view of a notebook computer with a drawer moved out to show the receptacle or socket for placement and storage of the embodiment of FIG. 1.
Figure 8:
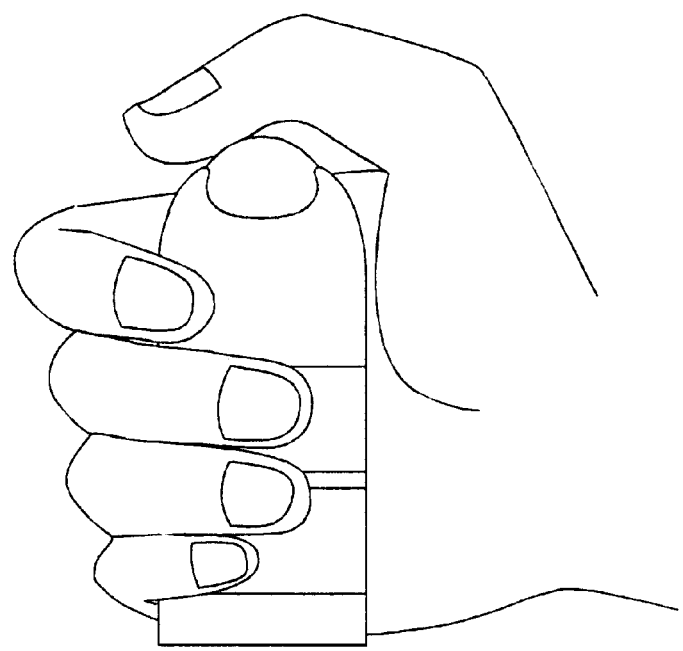
FIG. 8 is a front view of a second embodiment of the present invention.
Figure 9:
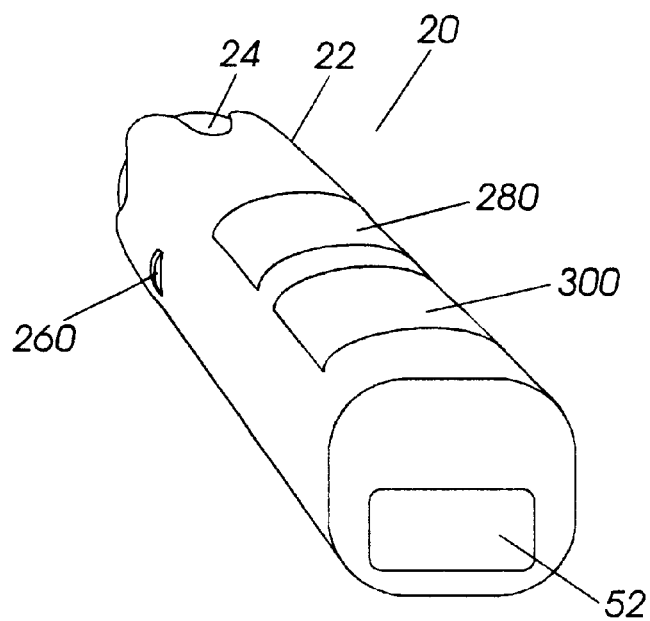
FIG. 9 is a perspective view of the embodiment of FIG. 8.

A remote wireless electrical signal unit 40 remotely (without a cable) converts the electrical signals from rolling movement detection unit 30 and switches 34, 36, to the computer through a remote wireless multiple electrical signal receiver 58 shown on FIG. 7 preferably placed on the front side of the frame for the computer screen. The location, size and shape of remote wireless electrical signal unit 40 may vary according to various designs of circuit board 48.

Circuit board 48 communicates electric currents and signals of rolling movement detection unit 30, click switches 34 and 36, and remote wireless electrical signal unit 40. Battery box 50 is under circuit board 48. The size of battery box 50 may vary as suitable for small batteries.

Mouse 20 is provided with four freely rolling wheel units 42A, 42B, 42C, 42D to support the upper surface of sphere 24. The wheels are preferably as small as possible and may be provided with or without tiny teeth in order to provide users with a certain feeling of control in the rotation of sphere 24. Alternatively, the wheels may be replaced with small round rolling balls or small long rollers. The holding bases of the wheels may also be disposed in a vertical direction to secure units 42A, 42B, 42C, 42D from the top of mouse 20.

Figure 3:
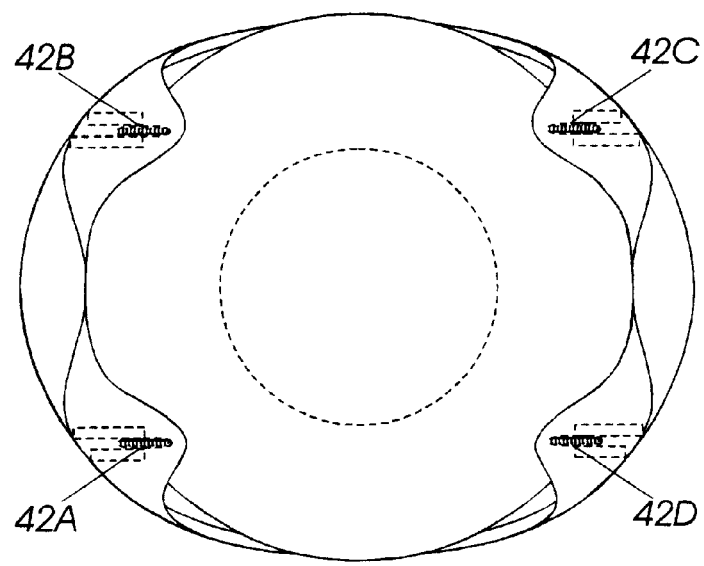
FIG. 3 is an enlarged top view of the embodiment of FIG. 1 partially broken away to show four freely rolling wheel units.

FIG. 3 is a top view of mouse 20 showing the location of the four freely rolling wheel units 42A, 42B, 42C, 42D (indicated by dot-dashed lines) holding the upper surface of large ball 24. The four freely rolling wheel units 42A, 42B, 42C, 42D may be arranged so that two wheel units 42A, 42C are arranged across from each other in the horizontal direction and wheel units 42B, 42D are arranged across from each other in the vertical direction for smoother rotation of large ball or sphere 24.

Figure 4:
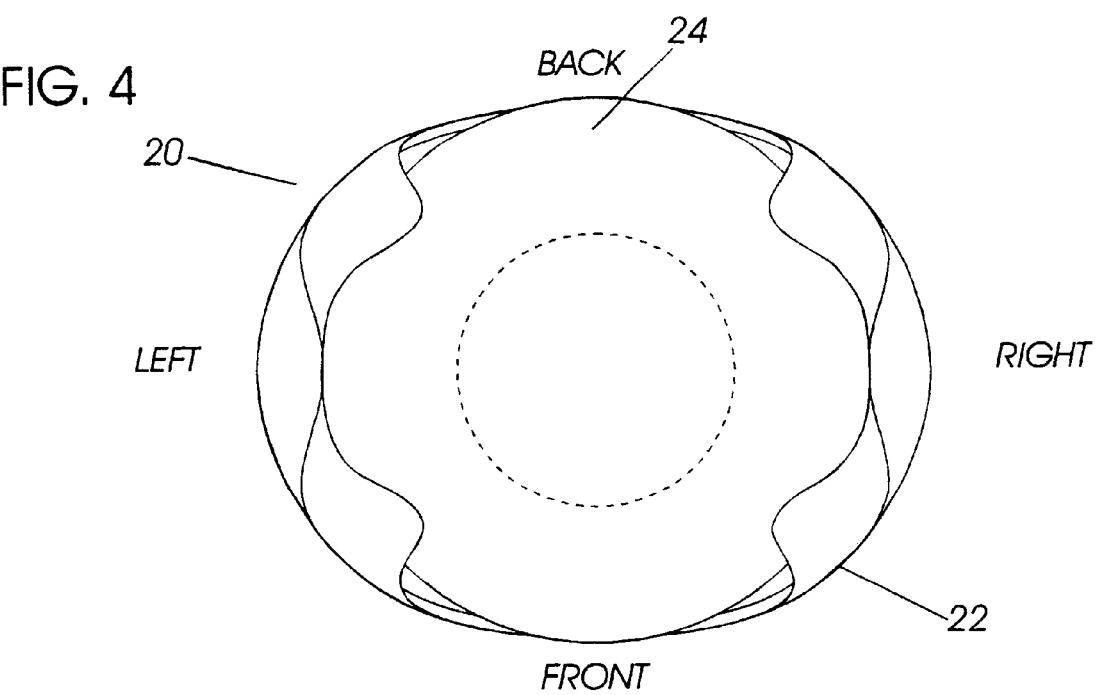
FIG. 4 is an enlarged top view of the embodiment of FIG. 1 indicating front, back, left and right sides.

FIG. 4 is another top view of mouse 40. As shown in FIG. 4, housing 22 of mouse 20 on the left and right sides is shaped wider than the diameter of large ball 24 and the front and back sides are narrower than the diameter of ball 24. The back side (not shown) where the user's fingers hold mouse 20 is preferably flat so that a user can lay mouse 20 back side down on a smooth surface to use as a conventional mouse. When mouse 20 is placed back side down, sphere 24 will touch the smooth surface and will rotate when mouse 20 is moved along the surface. Click buttons 38A and 38B will face up as in a conventional mouse. With this arrangement, a left handed user may turn mouse 20 right side left and use it as a left-handed mouse.

Figure 5:
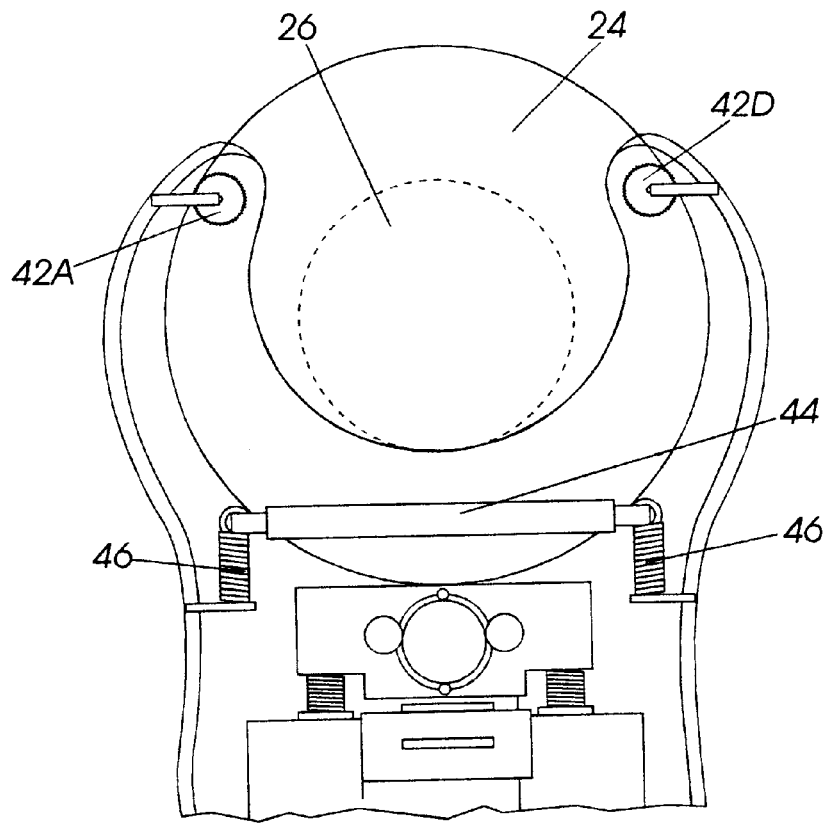
FIG. 5 is an enlarged side elevation view of the upper partial section of the embodiment of FIG. 1

As shown in FIGS. 2 and 5, mouse 20 has four freely rolling roller units 44 to support a lower surface of sphere 24. Roller units 44 form a square frame supported on a set of four spring units 46 to allow for up and down click movements of large ball 24.

As shown in FIG. 6, when large sphere 24 is rotated by the thumb of a user, the magnetic north pole and south pole pointing position of inside round magnetic core 26 (indicated by dot-dashed lines) are also rotated. This change in orientation causes small magnetic ball 28 to rotate inside rolling movement detection unit 30 in the reverse direction synchronously through the magnetic field intensity and magnetic force from magnetic core 26 and small magnetic ball 28. Magnetic core 26 may be centered within large ball 24 or moved down closer to rolling movement detection unit 30.

Because two like magnetic forces repel each other and two unlike magnetic forces attract each other in accordance with magnetic theory, magnetic north pole and magnetic south poles of core 26 and small magnetic ball 28 are initially aligned: when the north pole of magnetic core 26 is pointing at zero degrees of the magnetic north, the north pole of small magnetic ball 28 will be immediately attracted up to point at zero degrees of the magnetic north as well. In this condition, the cursor will be programmed to appear at a certain position, preferably at the center of the computer screen. When sphere 24 and inside magnetic core 26 are rotated in the clockwise direction of arrow 62, small magnetic ball 28 will synchronously be repelled or attracted to an opposite rotation in the counter-clockwise direction of arrow 64. Rolling movement detection unit 30 senses, registers, and transfers the rotation movement of small magnetic ball 28 into "X-" axis and "y-" axis motions to form digital signals that may be processed by the computer to produce corresponding cursor movements on the screen. The size and shape of rolling detection unit 30 may vary according to the inside electronic or electromechanical parts. A small circuit unit can be placed under rolling movement detection unit 30.

Because there is no direct contact between large sphere 24 and small magnetic ball 28, small magnetic ball 28 remains free from dirt accumulating on sphere 24. In this way, rolling movement detection unit 30 is able to detect the rotation of small magnetic ball 28 very precisely, leading to the accuracy of cursor movement on the screen.

There is a contact point between large ball 24 and the top surface of rolling movement detection unit 30. The top surface of rolling movement detection unit 30 may be level in the horizontal plane as shown in FIG. 6 or it may form an arch curve for more smoothly connecting and rotating sphere 24. A set of two spring unit 32 supports rolling movement detection unit 30 for up and down movements forced by the up and down click motions of sphere 24. The up and down movements of rolling movement detection unit 30 cause rolling movement detection unit 30 to touch and untouch the upside button of two-sided touch-down switch 34. By arranging the two spring units 32 under rolling movement detection unit 30, rolling movement detection unit 30 is able to activate touch-down switch 34 synchronously with the up and down click movements of large sphere 24.

As mentioned previously, two-sided touch down switch 34 is designed to take the same command from either of two touch buttons: one touch button is on the top side of switch 34 to take touch connections from rolling movement detection unit 30 when pressed down by large sphere 24 when sphere 24 is clicked. A user may move his thumb on sphere 24 to place the cursor in a selected location and press his thumb down to carry out a selected command. In addition, the user may press down on sphere 24 while rotating sphere 24 for his next selected operation to produce a continuous corresponding cursor movement for drawing or editing purposes without shifting or using his other fingers or hand. Another touch button is on the front side of switch 34 to take touch connections from the uppermost click button 38A similar to the left side click button of a conventional mouse.

FIG. 7 shows mouse 20 incorporated with a notebook computer system. A movable and separable drawer 54 is installed under the keyboard of a notebook computer 60. The location of drawer 54 may be on the front side of computer 60 as shown in FIG. 7, along side the keyboard, or on the right or left side of computer 60. A socket 56 in drawer 54 is provided to place or store mouse 20. Mouse 20 may be laid back side down and placed into socket 56. In this position, large sphere 24 is on the left side and all other click buttons 38A and 38B are facing up as in a conventional mouse with no pad and no cable. A user may easily use his thumb to rotate sphere 24 to locate a cursor on the screen and press click buttons 38A and 38B to carry out his commands. If left handed, the user can move drawer 54 to his left side, and turn drawer 54 one hundred eighty (180) degrees right side left. In this position, large ball 24 is toward the user's right hand direction. The user can easily rotate sphere 24 by his left hand thumb and press click buttons 38A and 38B with the other fingers of his left hand.

A remote wireless multiple electrical signal receiver 58 is preferably placed or installed on the front side of the screen frame as shown in FIG. 7. The exact location, size and shape of multiple signal receiver may vary according to the various designs of notebook computers. Remote wireless multiple electrical signal receiver 58 is able to receive the multiple electrical signals sent from a number of hand-held mobile mice 20 and transfer those signals to the computer for corresponding cursor movements, menu commands, and screen functions on the screen of a computer. At the same time, the computer analyzes the electrical signals for programmed identifications recognized by the computer. The numbers for the computer-recognized signal identification can be set or the computer may be programmed to accept only one signal or any signal. The select function for the computer recognized signal identification can be on mouse 20 or on a notebook or desktop computer or preferably incorporated within computer operating software.

Optionally, rather than pre-installing remote wireless multiple electrical signal receiver 58 into a computer, receiver 58 can be connected to a computer through a cable plugged into a regular mouse cable socket in the motherboard of a notebook computer or desktop computer.

The hand-held mobile mouse 20 of the second embodiment is shown in FIGS. 8–14 and is similar to the mouse of the first embodiment having a super mini-sized body 22 with a top inner collar edge to firmly support the upper portion of sphere 24. Certain materials can be attached along the top inner collar edge to promote smooth rolling of sphere 24 and to protect against dust. A wheel/click button 260 and two key buttons 280 and 300 for mouse click functions may be provided to activate cursor pointed menu commands or screen functions of selecting, deselecting, editing, moving, drawing, painting, opening, and closing, and cursor extension moving. etc.

A set of four freely rolling long roller units 44 are provided to support the bottom of sphere 24. A first support or board 440 forms a first floor to support small magnetic ball 28 and rolling movement detection units 66, 68 as shown on FIG. 11. A second support or board 380 forms a second floor to support freely rolling long roller units 44 and sphere 24. Second floor 380 is supported on first floor 440 by four columns 400. A set of spring units 46 installed under the four corners of first floor 440 support first floor 440 for the up and down movements caused by the up and down click motions of sphere 24. A strong firm frame 480 supports spring units 46.

A wheel/click switch 420 is located on first floor 440 for cursor extension movements in left/up or right/down directions and for click functions. The two front side touch switches 500, 520 are for press and release click functions of the two front side key buttons 280, 300. Switches 500, 520 and press buttons 280, 300 may also be arranged as one switch and one key button depending on the particular computer programmed operation functions needed. It is also possible to use a wheel/click button and switch to replace the front side buttons/switches 280/500 and 300/520 for easy use by a left handed or right handed user.

Figure 10:
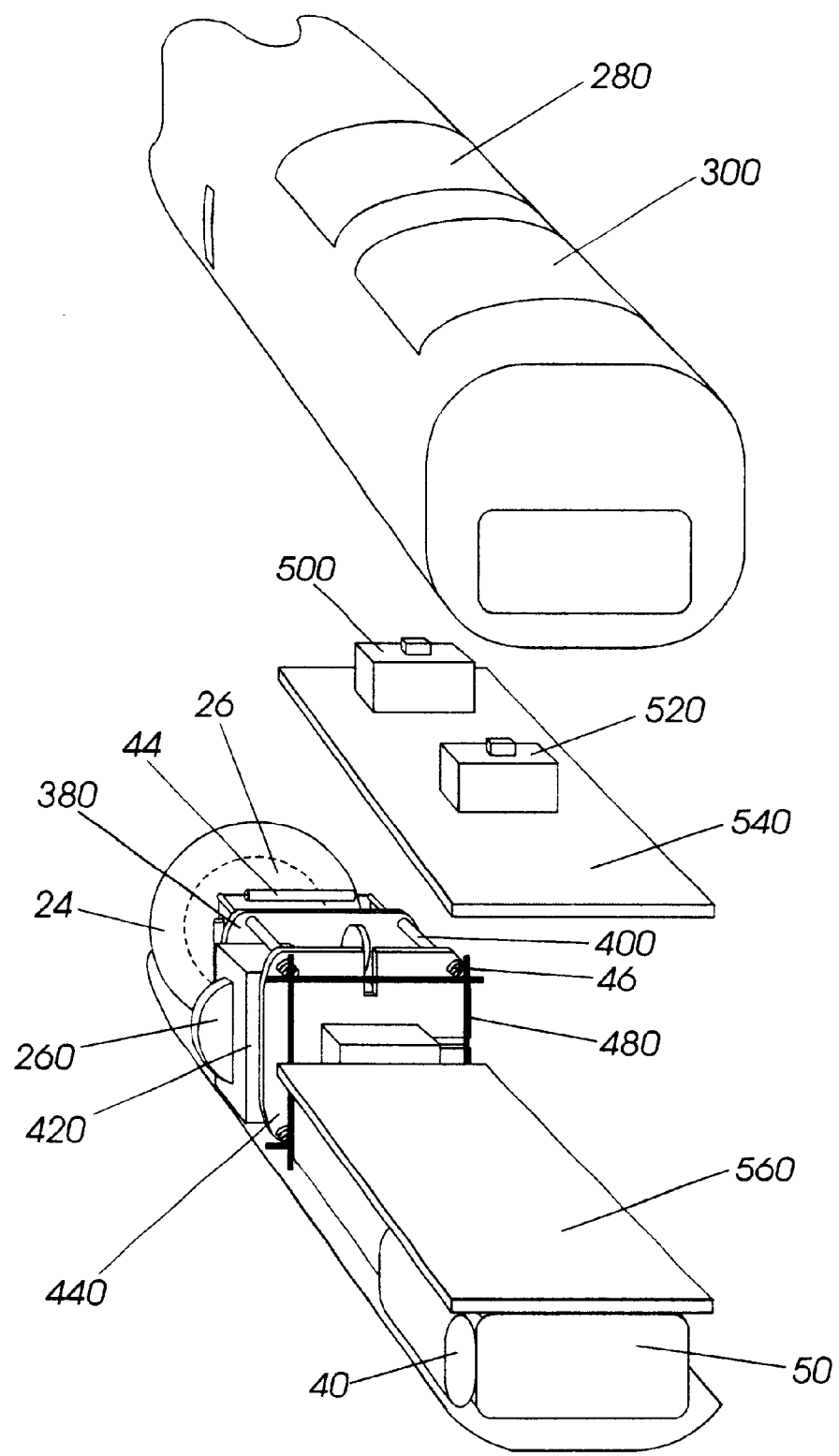
FIG. 10 is an exploded perspective view of the embodiment of FIG. 8.
Figure 11:
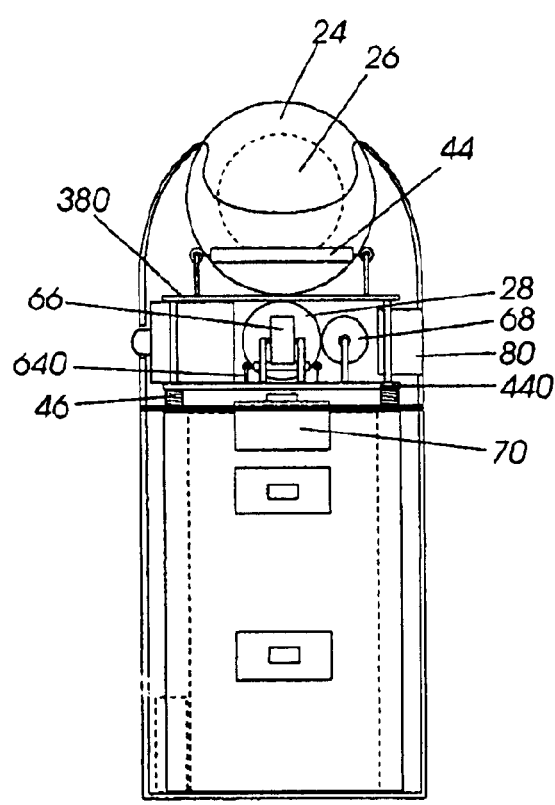
FIG. 11 is a front-side elevation view of the embodiment of FIG. 8.

There are two circuit boards 540,560 for communicating electric currents and signals of rolling movement detections units 66/68 shown in FIG. 11, click switches 420,500,520,70 shown in FIG. 11, and remote wireless electrical signal unit 40 shown in FIG. 10. Battery box 50 is under circuit board 560 and may vary in size for suitable small batteries.

Figure 14:
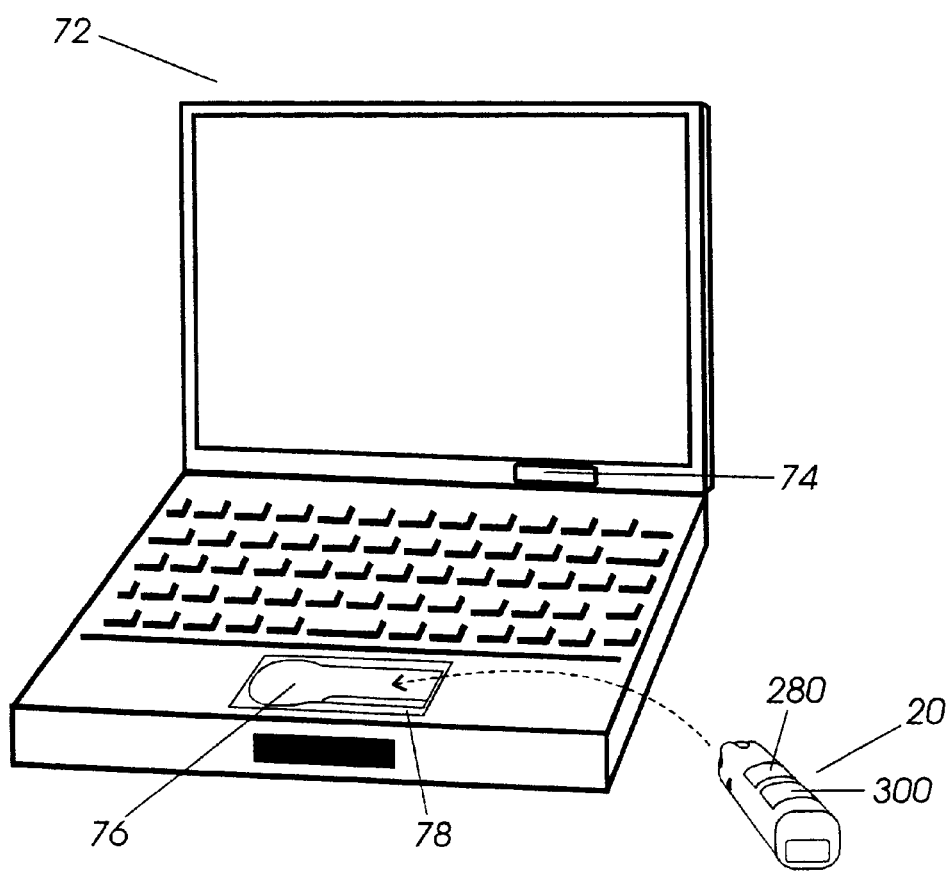
FIG. 14 is a perspective view of a notebook computer with a drawer/socket for the placement and storage of the embodiment of FIG. 8.
Figure 15:
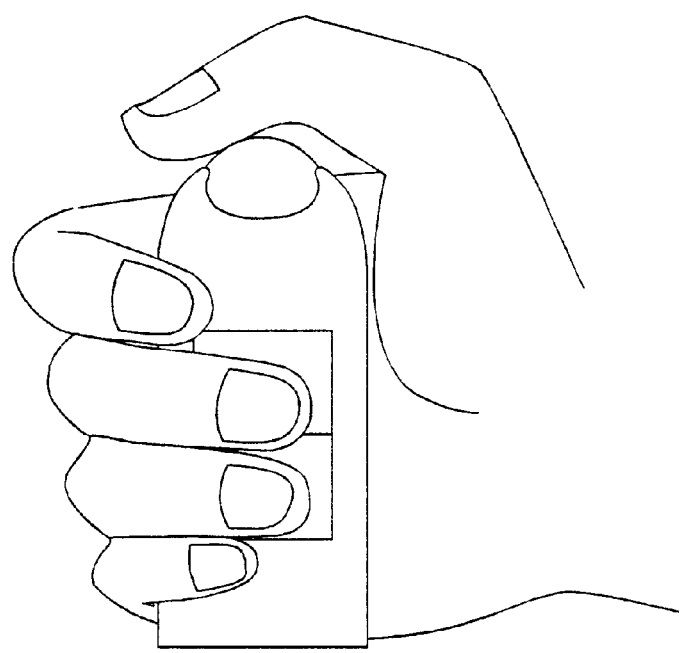
FIG. 15 is a front view of a third embodiment of the present invention.
Figure 16:
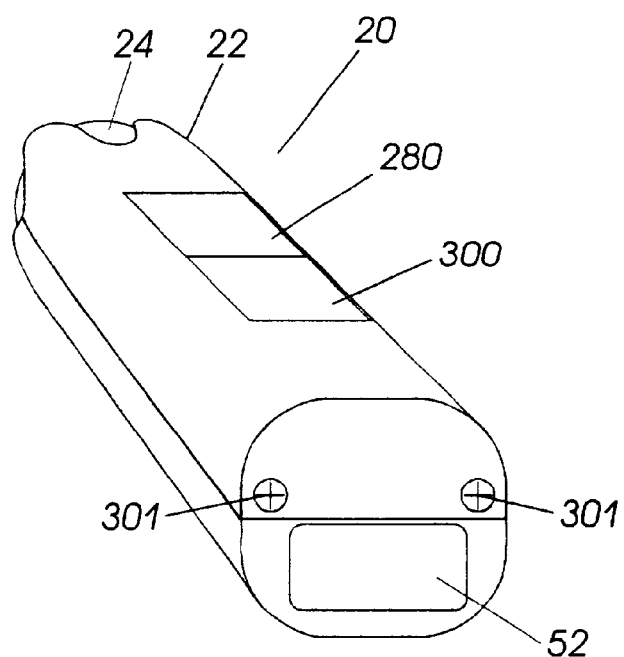
FIG. 16 is a perspective view of the embodiment of FIG. 15.

Remote wireless electrical signal unit 40 remotely (without a cable) converts the electrical signals from rolling movement detection units 66/68 and switches 420, 500, 520, 70 shown in FIG. 11 to the computer through a remote wireless multiple electrical signal receiver 74 shown in FIG. 14 usually placed on the front side of the screen of a computer. The location, size and shape of remote wireless signal unit 40 may vary according to various designs of circuit boards 540, 560.

Figure 12:
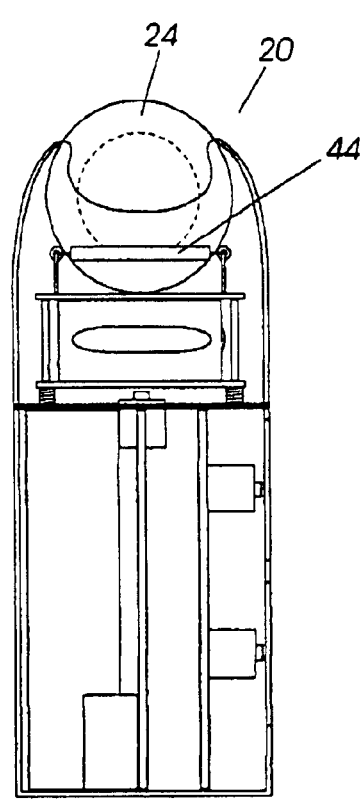
FIG. 12 is a left-side elevation view of the embodiment of FIG. 8.

As shown in FIGS. 11 and 12, mouse 20 has a set of four freely rolling long roller units 44 to support the bottom of large ball 24. The freely rolling long rollers may be replaced in whole or in part with small freely rolling round rollers.

When sphere 24 is rotated by the thumb of a user, the magnetic north pole and south pole position of inside magnetic core 26 changes and causes small magnetic ball 28 to rotate in the opposite direction synchronously from the magnetic field intensity and magnetic force between core 26 and small magnetic ball 28. Magnetic core 26 is preferably centered inside sphere 24 and its size may be varied.

Rolling movement detection units 66/68 sense, register, and transfer the rotation movements of small magnetic ball 28 into "X-" axis and "y-" axis motions to form digital signals that can be used by the computer for corresponding cursor movements on the screen. The size and shape of rolling detection units 66/68 may vary according to the inside electronic or electromechanical parts. Rolling movement detection units 66/68 may also be replaced by any commercially available motion detection device, such as an optical motion detector which detects light points emitted by the wheel of the detector as the rolling roller rotates.

Because there is no direct contact between sphere 24 and small magnetic ball 28, small magnetic ball 28 remains free of dirt accumulating on sphere 24, and rolling movement detection units 66/68 are able to detect the rotation of small magnetic ball 28 very precisely, leading to the accuracy of cursor movements on the screen.

A set of freely rolling long roller units, 640 is installed on first floor 440 to support the bottom of magnetic ball 28. It is also possible to install another set of freely rolling long roller units to hold the top portion of magnetic ball 28. Preferably, magnetic ball 28 is coated with a slippery material to promote rolling smoothness.

There is a contact point between sphere 24 and second floor 380. The top surface of second floor 380 may be horizontal and level or it may be curved to form an arch for smoothly connecting and rotating sphere 24.

Production costs may be saved in two ways. The first way is to install a set of rolling movement detection units directly in contact with sphere 24 with magnetic core 26 and magnetic ball 28 removed. The second way is to have sphere 24 directly contact ball 28 through an open hole in second floor 380. With this arrangement, magnetic core 26 can be removed and magnetic ball 28 replaced with a regular ball.

The up and down movements of first floor 440 through spring units 46 cause first floor 440 to touch and untouch touch-down switch 70. By placing spring units 46 under first floor 440, rolling movement detection units 66/68 will react synchronously with the up and down click movements of sphere 24.

Click switch 70 is designed to take click commands from touch connections of first floor 440 when first floor 440 is pressed down when sphere 24 is clicked. A user can move his thumb on sphere 24 to locate the cursor and press his thumb down to carry out a selected command. In addition, the user can hold his thumb pressed down while rotating sphere 24 to effect a continuous corresponding cursor movement for his drawing or editing purposes without shifting or using his other hand or fingers.

A switch 80 may be installed on the mouse to turn on and off the computer, the monitor, and the mouse itself. Preferably, switch 80 is located at about the middle or above the middle of the right side of mouse 20.

Figure 13:
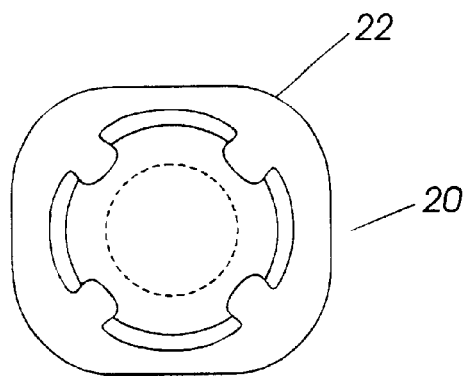
FIG. 13 is a top view of the embodiment of FIG. 8.

As shown in FIG. 13, the front and back sides of housing 22 may be shaped wide and the left and right sides narrow. The shapes and widths of all sides may be suitably adjusted depending on the preference of the maker or user.

FIG. 14 shows mouse 20 incorporated into a notebook computer system. A movable and separable socket/drawer 76/78 is preferably installed under or in front of the keyboard of a notebook computer 72 to place or store mouse 20. Mouse 20 can be laid back side down and placed into socket 76. In this position, sphere 24 is toward the left and click buttons 280,300 are facing up as in a conventional mouse without a mouse pad or a cable. A smooth open area is formed in the head of socket 76 for a user's thumb to touch the upper middle area of sphere 24. The user can easily use his thumb to rotate sphere 24 to locate a cursor on the screen and press click buttons 280, 300 to carry out his commands. Socket/drawer 76/78 may be reversed for a left handed user. In this position, sphere 24 is toward the right, and the user can easily rotate sphere 24 by his left hand thumb and press click buttons 280, 300 with the other fingers of his left hand.

It is also possible to install a touch connector (not shown) on both mouse 20 and the wall of socket 76. With this arrangement, when mouse 20 is laid down into socket 76, the two connectors touch each other to have the same function as the remote wireless electrical signal sender unit 40 and receiver 74 to transfer the electrical signals between mouse 20 and notebook computer 72.

As shown in FIG. 14, remote wireless multiple electrical signal receiver 74 is preferably placed or installed on the front of the computer screen frame. Notebook computer 72 may be programmed to analyze signals received by one or more mice 20 for identification purposes. As with the first embodiment, the numbers for computer recognized signal identified can be set or selected from one signal, two signals, and so on, or universal where the computer will recognize any signal.

FIGS. 15–21 show a third embodiment of mouse 20 which is easily held within the palm of a user's hand and is similar to the mouse of the first and second embodiments. Housing 22 is formed as a top and a bottom shell which may be opened or closed along an opening line. The opening line and manner of opening may vary. Housing 22 may have more downwardly extending curves along the top edge for more exposure of sphere 24.

If desired, the bottom of the curves may be made straight or have any other suitable shape. Mouse 20 preferably has two key buttons 280,300 for mouse click functions and two screws 301 to hold the top shell and button shell of mouse 20 together.

Figure 17:
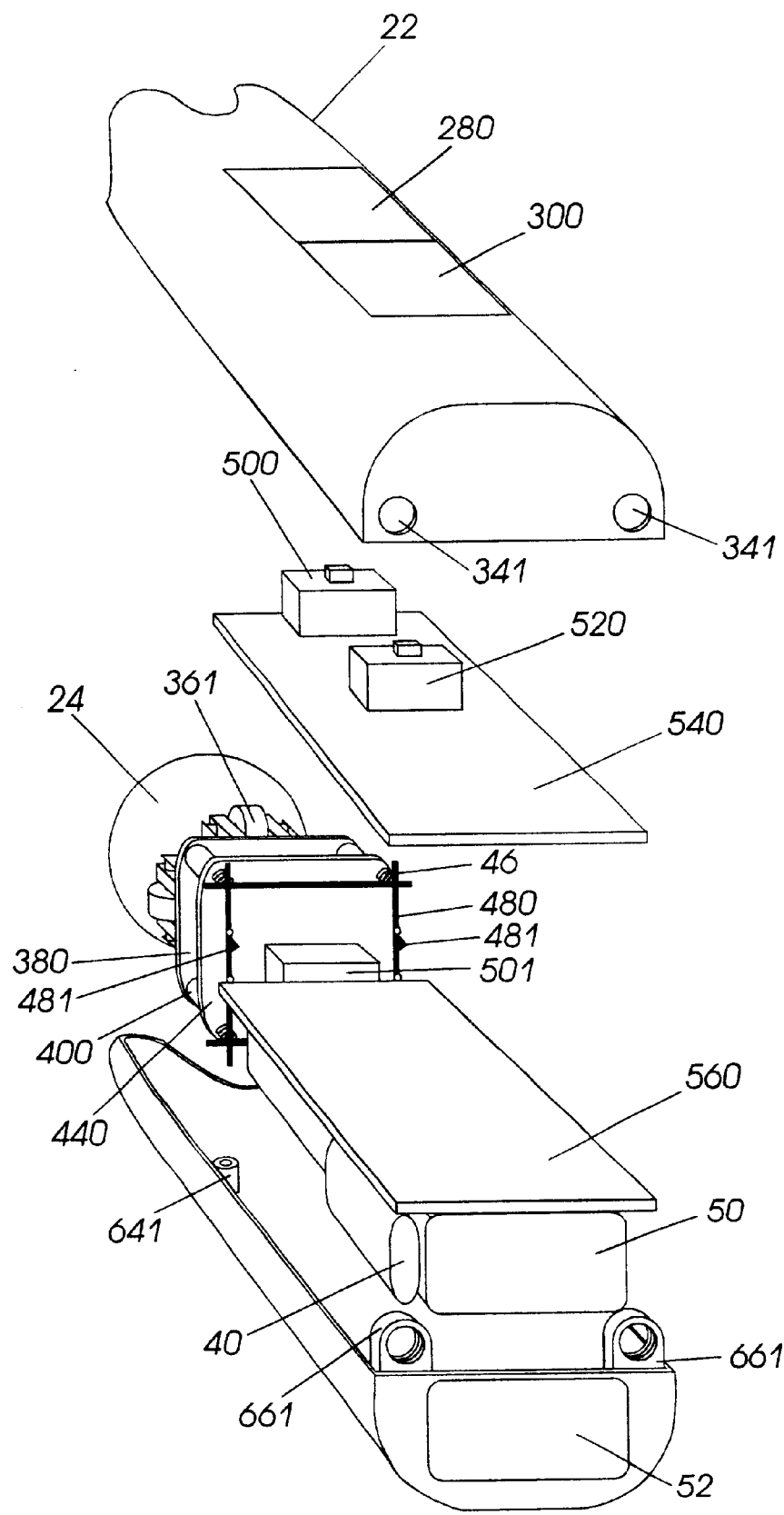
FIG. 17 is an exploded perspective view of the embodiment of FIG. 15.

As shown in FIG. 17, mouse 20 has a freely rotating sphere 24 which may be pressed and released in a vertical direction for click function. Sphere 24 may contain inside a small round metal ball whose size and location within sphere 24 may vary. Sphere 24 may be coated with a slippery material to promote rolling smoothness.

A set of four freely rolling roller units 361 support the bottom of sphere 24. A board as second floor 380 supports freely rolling roller units 361 and sphere 24. Another board as first floor 440 is installed for rolling movement detection unit 681 shown in FIG. 18. First floor 440 and second floor 380 can also be used for additional electrical circuit boards. As electrical processing circuit boards and electronic parts are built smaller, first floor 440 and second floor 380 may be combined into one processing circuit board floor. A set of spring units 46 installed under the four corners of first floor 440 supports first floor 440 and second floor 380 and effects the up and down click motions of sphere 24. A strongly firm frame 480 supports spring units 46. It is also possible to use two vertical columns strong enough to replace the four columns of frame 480. There are two short columns with holes 641(only one shown) on the inner bottom shell and two other identical columns (not shown) on the inner top shell. The top and bottom ends of the vertical columns of frame 480 are inserted into the holes of those short columns 641 to hold frame 480 in position. Frame 480 also has two small triangles 481 to hold circuit board 540.

The two front touch switches 500,520 are for press and release click functions of the two front key buttons 280, 300. Switches 500, 520 and press buttons 280, 300 may also be replaced by one switch and one key button depending on the particular computer programmed operation function requirements needed for mouse 20. It is also possible to use a wheel/click button and switch to replace front key button/switch 280/500.

Figure 18:
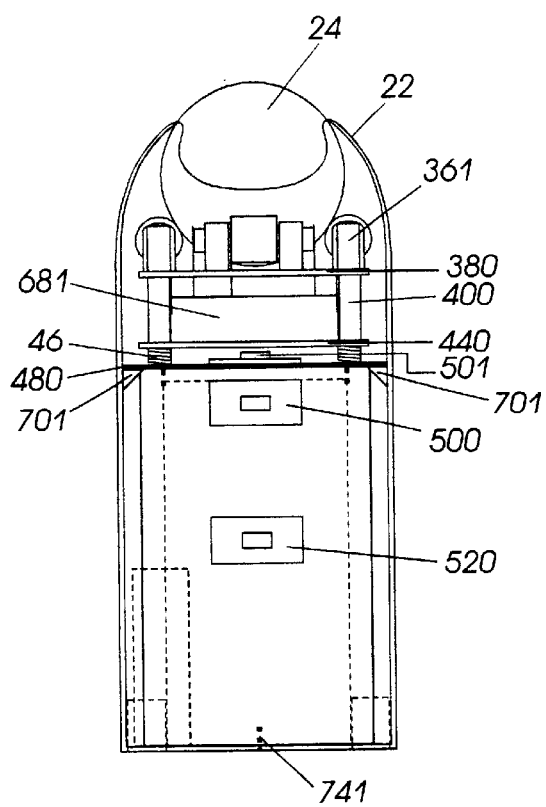
FIG. 18 is a front-side elevation view of the embodiment of FIG. 15.

There are two electrical processing circuit boards 540, 560 for electric currents and electronic signals by rolling movement detection unit 681 shown in FIG. 18, click switches 501, 500, 520, and remote wireless electronic signal unit 40. It is also possible to use one electrical circuit board instead of the two circuit boards 540, 560. A battery box 50 is under circuit board 560. The size of battery box 50 may vary as suitable to accommodate small batteries.

Figure 21:
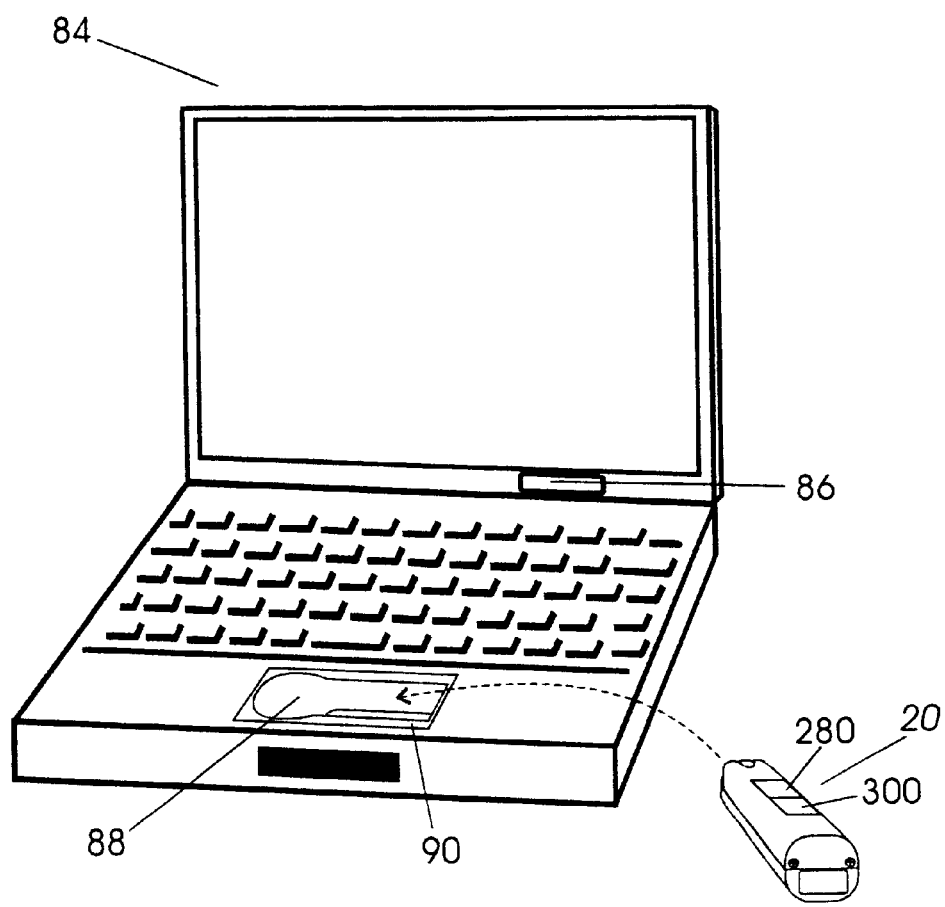
FIG. 21 is a perspective view of a notebook computer with a drawer/socket for the placement and storage of the embodiment of FIG. 15

A remote wireless electronic signal unit 40 remotely (wirelessly) converts the electronic and/or electromagnetic signals from rolling movement detection unit 681 and switches 501, 500, 520 to the computer through a remote wireless multiple electronic signal receiver 86 usually placed on the front of the computer screen frame as shown in FIG. 21. Remote wireless electronic signal unit 40 includes at least one radio frequency stabilizer and one transmitter, etc. The location, size and shape of remote wireless electronic signal-sending unit 40 may vary according to the particular design of circuit boards 540 and 560. An antenna (not shown) may be installed internally or externally to operate remote wireless electronic signal unit 40. At least one memory chip or process chip(not shown), for example, a mini central processing unit chip may also be installed on palm mobile mouse 20 by mounting the chip on the circuit board for signal processing programmed functions communicating with the computer or computers or particular computer software applications implemented by the computer. With that arrangement, mouse 20 can wirelessly receive, process, and store electronic signals and data from a notebook computer or a desktop computer or the Internet. Preferably, remote wireless electronic signal unit 40 contains signal sending and receiving functions.

As shown in FIG. 17, there are two holes 341 on the top shell and two screw bases 661 on the bottom shell for screws 301 (shown in FIG. 16) to screw the top and bottom shells together. The location and size of screws 301, holes 341, and screw bases 661 may vary and preferably they are made as small as possible. The head of the top shell is first inserted or slipped into the head edge of the bottom shell and then the end of the top shell is closed down to the end of the bottom shell and two shells screwed together.

Figure 19:
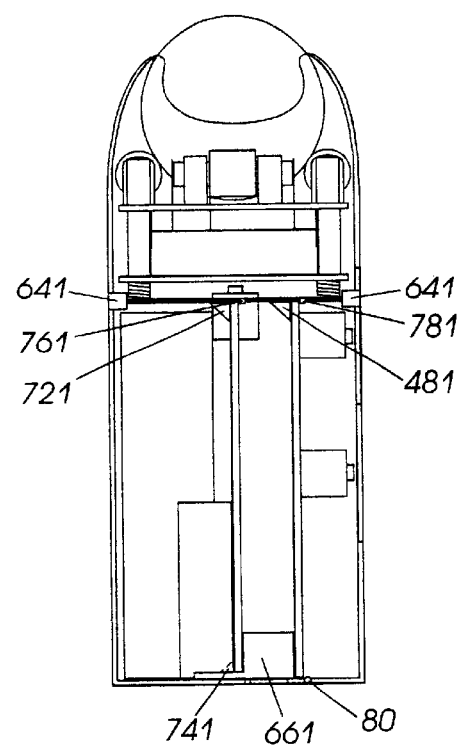
FIG. 19 is a left-side elevation view of the embodiment of FIG. 15.

As shown in FIGS. 18 and 19, there is a set of four freely rolling roller units 361 arranged in a square to support the bottom side of sphere 24. Two of the four freely rolling roller units 361 are used to detect X-Y axial rolling movement functions. Those two freely rolling roller units 361A, 361B (not shown) must be arranged with a 90 degree angle to each other for "X" axis and "y" axis rolling movement detection.

When the user's thumb rotates sphere 24, roller units 361 are forced to rotate. Two of them, roller units 361A, 361B transmit their X-Y axial rolling motions into rolling motion detection unit 681 for encoding of digital signals.

Rolling movement detection unit 681 senses, registers, and transfers the rotation movements of rolling roller units 361A, 361B into "X-" axis and "y-" axis motion to form digital signals that can be used by the computer for corresponding cursor movements on the screen. The size and shape of rolling detection unit 681 may vary according to the interior electronic or electromechanical parts. Rolling roller units 361A, 361B and/or rolling motion detection unit 681 can also be replaced or combined with any suitable motion detection device available in the market. Roller units 361 can also be replaced or combined with a track ball supporting device. The top surface of rolling movement detection unit 681 may also serve as second floor 380 and the bottom of rolling movement detection unit 681 as first floor 440.

The vertical movements of first floor 440 and second floor 380 through spring units 46 touch and untouch touch-down switch 501 so that the movements of sphere 24 are translated synchronously into cursor movement and click functions.

Click switch 501 is designed to take click commands from contact with first floor 440 when sphere 24 is clicked and first floor 440 is pressed down. A user moves his thumb on sphere 24 to locate the cursor and presses his thumb down to carry out a selected command. The user can also hold his thumb down on sphere 24 while rotating sphere 24 for continuous corresponding cursor movement for drawing or editing purposes without shifting or using his other hand or fingers. This function can also be used in all track ball mice.

Four small triangles 701 (only two shown) are placed on the inner wall of housing 22 to hold the heads of the two horizontal columns of frame 480.

Two small triangle members 721 (only one shown) and two dot members 761 (only one shown) are placed on the two vertical columns of frame 480 to hold one end of electrical circuit board 560. One small triangle member 741 is placed on the inner wall of the bottom shell to hold the other end of electrical circuit board 560.

Two small dot members 781 (only one shown) are placed on the two vertical columns of frame 480 and one dot member 80 is placed on the inner wall of the top shell to hold electrical circuit board 540.

A switch (not shown) to turn on/off the computer, the monitor, and the palm mobile mouse itself can also be installed.

Figure 20:
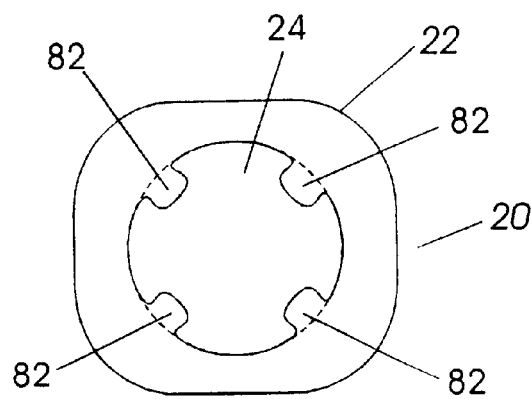
FIG. 20 is a top view of the embodiment of FIG. 15.

As shown in FIG. 20, housing 22 of palm mobile mouse 20 is shaped with its front and back sides wide and the left and right sides narrow. All sides, however, take any suitable shape and width. As shown in FIG. 20, there are four feet 82 on the top edge of housing 22 to buckle the top of sphere 24. It is also possible to use two or three feet instead of four feet. Small round rollers or points may also be attached underneath feet 82 to promote rolling smoothness of sphere 24.

FIG. 21 shows palm mobile mouse 20 incorporated in a notebook computer system. A movable and separable socket/drawer 88/90 is installed under or in front of the keyboard of a notebook computer 84 to place or store palm mobile mouse 20. Mouse 20 may be laid backside down and put into socket 88. In that position, sphere 24 is toward the left and click buttons 280, 300 are facing up as in a conventional mouse with no pad and no cable. The head of socket 88 has a smooth open area for a user's thumb to touch the middle to upper area of sphere 24. A user can easily use his thumb to rotate sphere 24 to locate a cursor on the screen and press click buttons 280, 300 to carry out his commands. A left-handed user can reverse the direction of socket/drawer 88/90. In that position, sphere 24 is toward the right and the user can easily rotate sphere 24 with his left thumb and press click buttons 280, 300 with his other left hand fingers.

It is also possible to install a touch connector (not shown) on palm mobile mouse 20 and another touch connector (not shown) on the wall of socket 88. When mouse 20 is laid down into socket 88, the two connectors touch each other to perform the same function as remote wireless electronic signal sender unit 40 and receiver 86 to transfer electronic signals between mouse 20 and notebook computer 84.

While several embodiments of the present invention have been shown and described, it is to be understood that may changes and modifications may be made thereunto without departing from the spirit and scope of the invention as defined in the appended claims.

What is claims is:

1. A hand-held mobile mouse for a computer system having an associated screen comprising:
   (a) a housing having a shape designed to be held in a user's hand, said housing having a top portion with an opening and a lower portion;
   (b) a sphere rotatable in any direction in said housing and having a portion partially surrounded by said opening so that said sphere is readily rotatable by the user's thumb when said lower portion of said housing is held in the user's palm;
   (c) a rolling movement detection unit for generating a cursor signal in response to rotation of said sphere for cursor movements on the screen of the computer system;
   (d) a plurality of spring units mounted in the housing for vertical movement of the sphere to generate a signal to activate a computer programmed click function operation;
   (e) four roller units mounted to support a lower surface of the sphere and enclosed within said housing by said lower surface of said sphere;
   (f) a remote wireless signal unit for converting the signals from the rolling movement detection unit to signals transmitted to the computer system;
   (g) a circuit board connected to remote wireless signal unit; and
   (h) a receptacle for batteries formed within the housing;
   wherein said rolling movement detection unit forms signals processed by the computer system to produce cursor movements on the screen of the computer system corresponding to the rotation of said sphere; and
   wherein said cursor movement can be continually produced on the screen of the computer system in any direction in two dimensional space corresponding to the rotation of said sphere pushed by the user's thumb during activation of the computer programmed click function operation by vertical movement of said sphere pushed by the thumb simultaneously.

2. A hand-held mobile mouse according to claim 1 further comprising at least one click key activator disposed on the housing for generating a signal to activate a computer programmed click function operation.

3. A hand-held mobile mouse according to claim 1 wherein the four roller units are mounted on the spring units.

4. A hand-held mobile mouse according to claim 1 wherein the four roller units are mounted on a board supported by the spring units.

5. A hand-held mobile mouse according to claim 1 wherein the sphere is made of an elastic material coated with a slippery material to promote rolling smoothness and further comprising four freely rotatory wheel units mounted in the housing to support an upper surface of the sphere.

6. A hand-held mobile mouse according to claim 1 further comprising a first support mounted on the spring units, a second support mounted on the first support, and a wheel/click button disposed on the housing connected to a switch for generating an electrical signal to activate a computer programmed click function operation.

7. A hand-held mobile mouse according to claim 2 wherein said click key activator comprises a press button and an associated switch for generating an electrical signal to activate a computer programmed operation.

8. A hand-held mobile mouse according to claim 7 having two press buttons and two switches associated with the press buttons.

9. A hand-held mobile mouse according to claim 1, wherein said roller units comprise freely rotatory elongated roller units.

10. A hand-held mobile mouse according to claim 1, wherein said sphere has a magnetic core and said rolling movement detection unit is magnetically activated.

11. A hand-held mobile mouse according to claim 1, wherein said rolling movement detection unit transfers rotation movements of said roller units into "X-" axis and "Y-" axis motions to form digital signals for corresponding cursor movements on the screen of the computer.

12. A hand-held mouse according to claim 1 comprising two electrical processing circuit boards for electric currents and electronic signals of the rolling movement detection unit.

13. A hand-held mouse according to claim 1 wherein the housing comprises a top and a bottom shell which may be opened or closed along an opening line.

14. A hand-held mobile mouse according to claim 1 wherein the housing comprises a top edge having a plurality of feet around an upper surface of the sphere.

15. A hand-held mobile mouse according to claim 14 wherein the top edge has a shape selected from the group consisting of straight edges, downwardly extending curves, and downwardly extending curves having a straight bottom.

16. A hand-held mobile mouse according to claim 1 further comprising an antenna to operate the remote wireless signal unit.

17. A hand-held mobile mouse according to claim 16 wherein the antenna is an external antenna.

18. A hand-held mobile mouse according to claim 16 wherein the antenna is an internal antenna.

19. A hand-held mobile mouse according to claim 1 further comprising a central processing unit chip mounted on the circuit board.

20. A hand-held mobile mouse according to claim 1 further comprising a memory chip mounted on the circuit board.

21. A hand-held mobile mouse according to claim 1 wherein the remote wireless signal unit has radio signal sending and receiving functions.

22. A hand-held mobile mouse according to claim 1 wherein the four roller units form a frame supported on the spring units to allow for up and down movements of the sphere to generate a signal to activate a computer programmed click function operation.

23. A notebook computer and mouse system comprising
(a) A notebook computer comprising
   (i) a screen;
   (ii) a keyboard;
   (iii) a remote wireless multiple signal receiver;
   (iv) a removable drawer; and
(b) A hand-held mobile mouse comprising
   (i) a housing having a shape designed to be held in a user's hand, said housing having a top portion with an open and a lower portion;
   (ii) a sphere rotatable in any direction in said housing and having a portion partially surrounded by said opening so that said sphere is readily rotatable by the user's thumb when said lower portion of said housing is held in the user's palm;
   (iii) a rolling movement detection unit for generating a signal in response to rotation of said sphere for cursor movements on the screen of the computer;
   (iv) a plurality of spring units mounted in the housing for vertical movement of the sphere to generate a signal to activate a computer programmed click function operation;
   (v) four roller units mounted to support a lower surface of the sphere and enclosed within said housing by said lower surface of said sphere;
   (vi) a remote wireless signal unit for converting the signals from the rolling movement detection unit to signals transmitted to the computer;
   (vii) a circuit board connected to the remote wireless signal unit; and
   (viii) a receptacle for batteries formed within the housing;
wherein said rolling movement detection unit forms signals processed by the computer system to produce cursor movements on the screen of the computer system corresponding to the rotation of said sphere; and
wherein said cursor movements can be continually produced on the screen of the computer system in any direction in two dimensional space corresponding to the rotation of said sphere pushed by the user's thumb during activation of the computer programmed click function operation by vertical movement of said sphere pushed by the thumb simultaneously.

24. A notebook computer and mouse system according to claim 23 further comprising at least one click key activator disposed on the housing for generating a signal to activate a computer programmed click function operation.

25. A notebook computer and mouse system according to claim 23 wherein the four roller units are mounted on the spring units.

26. A notebook computer and mouse system according to claim 23 wherein the four roller units are mounted on a board supported the spring units.

27. A notebook computer and mouse system according to claim 23, wherein said removable drawer is under the keyboard.

28. A notebook computer and mouse system according to claim 23, wherein said removable drawer is in front of the keyboard.

29. A hand-held mobile mouse for a computer system having an associated screen comprising:
(a) a housing having a shape designed to be held in a user's hand, said housing having a top portion with an opening and a lower portion;
(b) a sphere rotatable in any direction in said housing and having a portion partially surrounded by said opening so that said sphere is readily rotatable by the user's thumb when said lower portion of said housing is held in the user's palm;
(c) a rolling movement detection unit for generating a cursor signal in response to rotation of said sphere for cursor movements on the screen of the computer system;
(d) a plurality of spring units mounted in the housing for vertical movement of the sphere to generate a signal to activate a computer programmed click function operation;
(e) four roller units mounted to support a lower surface of the sphere and enclosed within said housing by said lower surface of said sphere;
(f) a remote wireless signal unit for converting the signals from the rolling movement detection unit to signals transmitted to the computer system;
(g) a circuit board connected to remote wireless signal unit; and
(h) a receptacle for batteries formed within the housing;
wherein at least two of said roller units are arranged orthogonally to each other in an X-axis and a Y-axis direction respectively so as to translate rotation of said sphere into corresponding rotation of said at least two roller units in the respective X-axis and Y-axis directions, said rolling movement detection unit detecting said respective rotation of said at least two roller units and forming signals processed by the computer system to produce cursor movements on the screen of the computer system in the X-axis and Y-axis direction corresponding to the respective rotations of said at least two roller units; and
wherein said cursor movements can be continually produced on the screen of the computer system in any direction in two dimensional space corresponding to the rotation of said sphere pushed by the user's thumb during activation of the computer programmed click function operation by vertical movement of said sphere pushed by the thumb simultaneously.

* * * * *

UNITED STATES PATENT AND TRADEMARK OFFICE
CERTIFICATE OF CORRECTION

PATENT NO. : 6,809,722 B2
DATED : October 26, 2004
INVENTOR(S) : Mei et al.

It is certified that error appears in the above-identified patent and that said Letters Patent is hereby corrected as shown below:

Title page,
Item [76], Inventors, please change the address for each of the inventors to correctly read: -- 99-14 74$^{th}$ Avenue, Forest Hills, NY 11375 --.

Column 13,
Line 27, after the word "sphere", please add -- at the edge of the housing --.
Line 47, after the word "to," please add the word -- said --.

Column 15,
Line 10, after the word "an," delete the word "open" and replace it with -- opening --.
Line 11, after the word "sphere" please add -- at the edge of the housing --.
Line 34, after the word "computer," delete the word "system".
Lines 35-36, after the word "computer," delete the word "system".
Line 53, after the word "supported," add the word -- by --.

Column 16,
Line 12, after the word "sphere," please add -- at the edge of the housing --.
Line 30, after the word "to," add the word -- said --.
Line 43, after the term "Y-axis," change the word "direction" to correctly read -- directions --.

Signed and Sealed this

Fifteenth Day of February, 2005

JON W. DUDAS
*Director of the United States Patent and Trademark Office*